United States Patent Office 2,720,480
Patented Oct. 11, 1955

2,720,480

FUNGICIDAL COMPOSITIONS AND METHOD OF USING SAME

Calvin N. Wolf, New York, N. Y., assignor to Ethyl Corporation, New York, N. Y., a corporation of Delaware No Drawing. Application July 17, 1953,
Serial No. 368,845

20 Claims. (Cl. 167—33)

This invention relates to novel fungitoxic compositions. In particular this invention relates to the protection of materials susceptible to fungus attack by incorporating therewith, or applying thereto, the triazine fungitoxicants of our invention. Our invention also relates to methods of formulating such compounds into useful fungicides and methods of their application.

The broad class of compounds known as 1,3,5-triazines, or s-triazines, have been known for some time as chemical intermediates. However, it has not been known prior to this discovery thereof that by inclusion of certain selected groups into the 1,3,5-triazine nucleus and proper admixture with relatively fungicidally surface-contacting agents, adjuvants, dispersants, carriers, diluents or vehicles, an important class of extremely effective fungicides can be obtained.

By the term "fungicide" is meant to include not only the property of destroying fungi but also the property of inhibiting the germination of the spores, or the sporulation, of the fungi a property sometimes also referred to as fungistatic or fungitoxic.

It is an object of this invention to provide materials, and compositions and formulations thereof, which are effective in preventing fungicidal attack. It is a further object of this invention to provide compositions which can be applied to materials normally susceptible to attack by fungus organisms and which prevent such attack. It is a further object of this invention to provide a group of organic materials which provide such protection against a diversity of fungus organisms and under a diversity of conditions of use, and to a diversity of materials, and in a diversity of media.

The fungitoxic agents in these compositions are substituted 1,3,5-triazines. Our preferred materials are chloro arylamino 1,3,5-triazines. In general the preferred fungitoxic materials comprise those tri-(C-substituted)-1,3,5-triazines, wherein at least one substituent is chlorine and at least one substituent is arylamino. While it is essential that there be at least one such arylamino group on the 1,3,5-triazine nucleus of the compounds of this invention, it is not intended that the meaning of the term aryl should be limited to a hydrocarbon group nor that when two such aryl groups are present that they be identical. Thus the fungitoxic 1,3,5-triazines of this invention can be supplied wherein the aryl group on the exocyclic nitrogen atom is further substituted with certain other radicals described in more detail hereinafter. Furthermore such aryl groups are not limited to phenyl as polynuclear aromatic groups function equally well and for some uses are preferred.

Among the simpler members of the class of materials which have been discovered to have unusual fungitoxic properties are 2-chloro-4,6-dianilino-s-triazine and 2,4-dichloro-6-anilino-s-triazine. Among the aryl groups which can be substituted on at least one of the exocyclic nitrogen atoms of the fungicides typical examples include phenyl, diphenyl, α-naphthyl, β-naphthyl, phenanthryl and anthracyl. In the latter examples, the polynuclear aryl group can be attached to the exocyclic nitrogen atom through any of several positions.

A preferred class of the 2-chloro-4,6-diarylamino- and 2,4-dichloro-6-arylamino-s-triazines comprises those in which one or more of the aryl groups is further substituted with hydrocarbon radicals. For example, the aryl group can be substituted with a straight chain aliphatic radical such as methyl, ethyl, propyl, hexyl or dodecyl, or the isomeric or branched chain equivalents thereof such as, for example, isopropyl, isobutyl, sec.-butyl and the various branched chain amyl, hexyl, nonyl and higher aliphatic radicals, etc. Furthermore, these aryl groups can be substituted with endo-aliphatic groups for example, methylene, ethylene, propylene and butylene to provide the corresponding phenyl endo-methylene, phenyl endoethylene, hydrindene and tetralin radicals. Likewise the aryl group can be further substituted with the same or other aryl group. Other examples of such embodiments of the compounds of this invention include those triazines as defined above wherein the exocyclic nitrogen atom is substituted with acenaphthene, and fluorene groups. The hydrocarbon substituents can be the same or different, when polysubstitution occurs.

Specific examples of such 1,3,5-triazine fungicides of this invention include 2-chloro-4,6-bis(p-phenylanilino)-s-triazine, 2,4-dichloro-6-(p-phenylanilino)-s-triazine, 2-chloro-4,6-bis(o-phenylanilino)-s-triazine, 2,4-dichloro-6-(o-phenylanilino)-s-triazine, 2-chloro-4,6-bis(α-naphthylamino)-s-triazine, 2,4-dichloro-6-(α-naphthylamino)-s-triazine, 2-chloro-4,6-bis(β-naphthylamino)-s-triazine, 2,4-dichloro-6-(β-naphthylamino)-s-triazine, 2-chloro-4-anilino-6-(α-naphthylamino)-s-triazine, 2-chloro-4-(p-phenylanilino)-6-(β-naphthylamino)-s-triazine, 2-chloro - 4,6 - bis(9-phenanthrylamino)-s-triazine, 2,4-dichloro-6-(p-toluino)-s-triazine, 2,4-dichloro-6-(o-toluino)-s-triazine, 2-chloro-4-(2,4-dimethylanilino)-6-anilino-s-triazine, 2,4-dichloro-6-(3-dodecylanilino)-s-triazine, 2,4-dichloro-6-(o-ethylanilino)-s-triazine, 2-chloro-4,6-bis(p-cumidino)-s-triazine, 2,4 - dichloro - 6 - (4-(mixed)amylanilino)-s-triazine, 2-chloro-4-anilino-6-(4-hydrindenylamino)-s-triazine, and 2,4-dichloro-6-(3-acenaphthylamino)-s-triazine.

In addition to such substituents the aryl groups of the 1,3,5-triazine fungicidal compositions of this invention can contain corresponding unsaturated radicals such as for example the vinyl, propenyl, allyl groups, etc. For example, such typical fungicidal triazines of this invention include 2-chloro-4,6-bis(p-vinylanilino)-s-triazine, 2,4-dichloro - 6 - (o-propenylanilino)-s-triazine, 2-chloro-4-(o-vinylanilino)-6-anilino-s-triazine, 2,4-dichloro-6-(p-allylanilino)-s-triazine, and 2-chloro-4,6-bis(p-methallylanilino) - s - triazine, 2 - chloro - 4,6-bis(2-vinyl-α-naphthylamino)-s-triazine, 2,4-dichloro-6-(5-propenyl-β-naphthylamino)-s-triazine and the like.

It is not intended, however, that this invention be limited to substituted 1,3,5-triazines as above. For example, the aryl groups as defined above can be substituted further with a variety of negative radicals and not only retain the fungitoxic effectiveness which has been discovered, but also in many instances provide enhanced activity and thereby produce a class of fungicides which is preferred for certain applications. Examples of such negative groups which can be substituted in the aryl radicals include nitroso, nitro, amino, substituted amino, chloro, bromo or iodo groups as well as the hydroxyl, substituted hydroxyl, azo, cyano, thiocyano, acyloxy, aroyloxy, mercaptyl and substituted mercaptyl groups. Furthermore, various combinations of the above enumerated hydrocarbon and negative radicals can be employed and maintain, and in some instances enhance, the fungitoxic property of these compounds.

Further examples of the chloro arylamino 1,3,5-triazine fungicides of this invention include 2-chloro-4,6-bis(4-chloroanilino)-s-triazine, 2,4-dichloro-6-(2-chloroanilino) - s-triazine, 2,4-dichloro-6-(4-bromoanilino)-s-triazine, 2 - chloro - 4-anilino-6-(4-chloroanilino)-s-triazine, 2 - chloro-4,6-bis(2,5-dichloroanilino)-s-triazine, 2 - chloro - 4 - (4 - chloroanilino) - 6 - (4 - nitroanilino)-s-triazine, 2,4 - dichloro - 6 - (4 - chloroanilino) - s-triazine, 2,4-dichloro-6-(p-anisidino)-s-triazine, 2-chloro-4,6 - bis(4 - nitroanilino) - s - triazine, 2 - cholor - 4,6-bis(4 - hydroxyanilino) - s - triazine, 2,4 - dichloro-6 - (α - (4 - chloro - naphthylamino)) - s - triazine, 2-chloro - 4 - (o - anisidino) - 6 - (3 - mercaptoanilino)-s - triazine, 2,4 - dichloro - 6 - (4 - aminoanilino) - s-triazine, 2,4 - dichloro - 6 - (2 - dimethylaminoanilino)-s-triazine, 2 - chloro - 4 - (toluino) - 6 - (4 - nitro - 2-chloroanilino) - s - triazine, 2,4 - dichloro - 6 - (α - (4-dimethylaminonaphthylamino)) - s - triazine, 2 - chloro-4,6 - bis(p - anisidino) - s - triazine, 2,4 - dichloro - 6-(4(β - chloroethyl)anilino) - s - triazine, 2 - chloro -4,6 - bis(p - nitrosoanilino) - s - triazine, 2,4 - dichloro-6 - (p - phenylazoanilino) - s -triazine, 2,4 - dichloro-6 - (1,2,3 - trichloro - 4 - nitroanilino) - s - triazine, 2,4 - dichloro - 6 - (1,3,4 - trichloro - 2 - nitroanilino)-s-triazine, 2,4 - dichloro - 6 - (1,2,5 - trichloro - 4 - nitroanilino) - s - triazine, 2 - chloro - 4,6 - bis(1,2,3 - trichloro-4-nitroanilino)-s-triazine, 2-chloro-4,6-bis(1,3,4 - trichloro - 2 - nitroanilino) - s - triazine, 2 - chloro-4,6-bis(1,2,5-trichloro-4-nitroanilino)-s-triazine, 2-chloro-4-(1,2,3 - trichloro - 4 - nitroanilino) - 6 - (1,2,5 - trichloro-4 - nitroanilino) - s - triazine, 2 - chloro - 4,6 - bis(p-cyanoanilino) - s - triazine, 2,4 - dichloro - 6 - (p - thiocyanoanilino) - s - triazine, 2 - chloro - 4,6 - bis(p - acetoxy-o-toluino)-s-triazine, 2,4-dichloro-6-(p-benzoyloxyanilino) - s - triazine, 2 - chloro - 4 - (4 - methylmercaptoanilino)-6-(p-anisidino)-s-triazine, 2,4-dichloro-6-(2 - bromoanilino) - s - triazine, 2,4 - dichloro - 6 - (3-chloroanilino) - s - triazine, 2,4 - dichloro - 6 - (2,5-dichloroanilino) - s - triazine, 2,4 - dichloro - 6 - (4-cyanoanilino - s - triazine, 2,4 - dichloro - 6 - (4 - nitroanilino) - s - triazine, 2,4 - dichloro - 6 - (4 - azobenzeneanilino) - s - triazine, 2,4 - dichloro - 6 - (3 - bromoanilino)-s-triazine, 2,4-dichloro-6-(4-bromoanilino)-s-triazine, 2,4-dichloro-6-(2,4-dichloranilino)-s-triazine, 2,4-dichloro - 6 - (2 - methyl - 3 - chloroanilino) - s - triazine, 2,4 - dichloro - 6 - (2 - methyl - 5 - chloroanilino) - s-triazine and the like.

In the protection of susceptible materials from fungus attack it is usually not sufficient to provide an agent which has the power of destroying fungi or preventing the germination or sporulation thereof. Other properties such as for example low toxicity to mammals, prolonged weathering resistance, non-staining or discoloring characteristics, low phytotoxicity, low or controlled volatility, compatibility with the vehicle, carrier, dispersant and with other co-present active ingredients, must be considered before a fungitoxicant can achieve commercial utility. It is for these and other reasons that it is advisable in many instances to provide the fungicidal agents of this invention with more than those essential groups that have been found to provide the fungitoxic property.

While it is essential that at least one of the exocyclic nitrogen atoms of the fungitoxic agents contain an aryl substituent, the second substituent of this nitrogen atom can be varied within wide limits and still retain the novel property which has been discovered. For example it has been discovered that such compounds as 2,4-dichloro - 6 - (N - methylanilino) - s - triazine, 2 - chloro-4,6-bis(N-methylanilino)-s-triazine, 2-chloro-4,6-bis(N-methyl - 2,5 - dichloroanilino) - s - triazine, 2 - chloro-4 - (N - methylanilino) - 6 - (α - naphthylamino) - s-triazine, 2-chloro-4-(2,5-dichloroanilino)-6-(N-methyl-p-anisidino)-s-triazine, 2-chloro-4,6-bis(diphenylamino)-s-triazine, 2 - chloro - 4,6 - bis(N - methyl - N - (4 - phenylaminophenyl))-s-triazine, and 2-chloro-4-(N-(p-tolyl)-N - (p - methoxyphenyl)) - 6 - (4 - nitroanilino) - s-triazine, when employed in accordance with this invention are potent fungicides.

In the following examples of methods which have been employed in preparing typical representatives of the 1,3,5-triazine fungicides of this invention all parts and percentages are by weight.

EXAMPLE I

*2,4-dichloro-6-(p-anisidino)-s-triazine.*—A solution of 75.5 parts of cyanuric chloride in 660 parts of dry benzene was placed in a reaction vessel equipped with an agitator and cooled to a temperature of 5–10° C. A solution of 102 parts of p-anisidine in 440 parts of benzene was added with vigorous stirring over a period of one hour. The mixture was then warmed to 20–25° C., and stirring was continued for two hours. The crude reaction product was collected on a filter, washed with 600 parts of 2N hydrochloric acid, and 1000 parts of water, and then recrystallized from benzene. The dichloro-anisidino triazine was obtained in a yield of 75 parts (69%) as white crystals, melting at 167–169.5° C.

EXAMPLE II

*2,4-dichloro-6-(p-chloroanilino)-s-triazine.*—This compound was prepared by the procedure of Example I, using 74.5 parts of cyanuric chloride and 103 parts of p-chloroaniline. The yield of white crystals was 105 parts (95%), melting at 183–185° C.

EXAMPLE III

*2,4-dichloro-6-(α-naphthylamino)-s-triazine.*—A solution of 100 parts of cyanuric chloride in 320 parts of acetone was added to 1000 parts of crushed ice. To the vigorously stirred suspension of cyanuric chloride was added a solution of 77.6 parts of α-naphthylamine in 120 parts of acetone over a period of two hours at a rate such that the reaction temperature was maintained at 0–5° C. A solution of 21.7 parts of sodium hydroxide in 412 parts of water was then added over a period of about one hour, and the mixture was stirred at a temperature of 0° C. for one hour and then at 20–25° C. for an additional 30 minutes. The solid product was collected on a filter, washed with 1500 parts of water, and dried. The yield of triazine was 137.3 parts (87%), melting at 144–148° C.

EXAMPLE IV

*2,4 - dichloro - 6 - (β-naphthylamino)-s-triazine.*—This compound was prepared by the procedure of Example III, using 100 parts of cyanuric chloride and 77.6 parts of β-naphthylamine. The yield of white crystals was 156 parts, melting at 156° C.

EXAMPLE V

*2,4-dichloro-6-(p-toluino)-s-triazine.*—This compound was prepared by the procedure of Example III, using 144 parts of cyanuric chloride and 107.1 parts of p-toluidine. The yield of white crystals was 192.2 parts, melting at 129–131° C. After recrystallization from benzene, the product melted at 130–131° C. *Anal.*—Calcd. for $C_{10}H_8N_4Cl_2$: Cl, 27.8 per cent. Found: Cl, 27.5 per cent.

EXAMPLE VI

*2,4 - dichloro - 6 - (N-methylanilino)-s-triazine.*—This compound was prepared by the procedure of Example III, using 110.7 parts of cyanuric chloride and 64.3 parts of N-methylaniline. The yield of triazine was 135.2 parts, melting at 118–126° C. After recrystallization from benzene, the product melted at 131–132° C.

EXAMPLE VII

*2 - chloro-4,6-bis(2,5-dichloroanilino)-s-triazine.*—In a reaction vessel equipped with an agitator a suspension of 2,760 parts of cyanuric chloride in 40,000 parts of water was prepared at a temperature 3–8° C. To the stirred suspension was added 4,900 parts of solid 2,5-dichloroaniline over a period of 30 minutes. A solution of 2,520 parts of sodium bicarbonate in 20,000 parts of water was then added. The reaction temperature was raised to 45° C. and held at 45–50° C. for two hours. After cooling to a temperature of 25° C., the product was collected by filtration, washed with water, and dried. The yield of white crystals was 6700 parts (96.5%), melting at 192–194° C. *Anal.*—Calcd. for $C_{15}H_8N_5Cl_5$: Cl, 40.7 per cent. Found: Cl, 41.3 per cent.

EXAMPLE VIII

*2-chloro-4,6-bis(p-nitroanilino)-s-triazine.*—This compound was prepared by the procedure of Example VII, using 2,760 parts of cyanuric chloride and 4,150 parts of p-nitroaniline. The yield of yellow product was 5700 parts, melting at 382–383° C.

EXAMPLE IX

*2 - chloro - 4,6 - bis(p - anisidino) - s - triazine.*—This compound was prepared by the procedure of Example VII, using 55.4 parts of cyanuric chloride and 76 parts of p-anisidine. The yield was 89 parts (83%), melting at 200–201° C.

EXAMPLE X

*2 - chloro-4,6-bis(p-chloroanilino)-s-triazine.*—A solution of 51 parts of cyanuric chloride in 250 parts of acetone was added to 800 parts of crushed ice. With vigorous agitation 70 parts of p-chloraniline was added, and the mixture was stirred for one hour at a temperature of 5° C. A solution of 22 parts of sodium hydroxide in 250 parts of water was then added over a period of one hour. The reaction was completed by stirring at 45 to 50° C. for one additional hour. After cooling, the product is collected on a filter, washed with water, and dried. The yield of white crystals was 99 parts (98%), melting at 218–219° C.

EXAMPLE XI

*2 - chloro - 4,6-bis(anilino)-s-triazine.*—This compound was prepared by the procedure of Example X, using 69.3 parts of cyanuric chloride and 70 parts of aniline. The yield of white crystals was 109 parts (99%), melting at 194–195° C. *Anal.*—Calcd. for $C_{15}H_{12}N_5Cl$: Cl, 11.9 per cent. Found: Cl, 11.5 per cent.

EXAMPLE XII

*2 - chloro 4,6 - bis(α-naphthylamino)-s-triazine.*—This compound was prepared in 99% yield by the procedure of Example X by treating cyanuric chloride with α-naphthylamine. The product was obtained in the form of white crystals, melting at 209–210° C. *Anal.*—Calcd. for $C_{23}H_{16}N_5Cl$: Cl, 8.91 per cent. Found: Cl, 8.94 per cent.

EXAMPLE XIII

*2 - chloro - 4,6 - bis(N-methylanilino)-s-triazine.*—This compound was prepared in 89% yield by the procedure of Example X using cyanuric chloride and N-methylaniline. The product was obtained in the form of white crystals, melting at 84.5–87.0° C. *Anal.*—Calcd. for $C_{17}H_{16}N_5Cl$: Cl, 10.8. Found: Cl, 10.8

EXAMPLE XIV

*2,4 - dichloro - 6 - (o - bromoanilino) - s - triazine.*—37 parts of cyanuric chloride and 150 parts of acetone was slurried with 100 parts of water and 400 parts of ice. To this stirred suspension over a period of ½ hour was added a solution of 34.4 parts of o-bromoaniline in 150 parts of acetone. Over a second ½ hour period was added a solution of 8 parts of sodium hydroxide in 100 parts of water, while maintaining the temperature below 5° C. The resulting mixture was agitated for an additional 2 hours at a temperature between 5 and 25° C. The solid product was recovered by filtration and the filter cake washed with 500 parts of 5 per cent hydrochloric acid followed by a wash with 600 parts of water. Upon drying the product in air 61.8 parts of 2,4-dichloro-6-(o-bromoanilino)-s-triazine was obtained having a melting point of 153 to 157° C. representing a 97 per cent yield. A somewhat purer product was obtained by recrystallization from benzene having a melting point of 158.5 to 159° C. The product contained 22.0 per cent chlorine and 24.4 per cent bromine corresponding to 22.2 and 25.0 per cent, respectively, in accordance with the empirical formula.

EXAMPLE XV

*2,4 - dichloro - 6 - (2,5 - dichloroanilino) - s-triazine.*—According to the procedure of the preceding example the reaction of 73.8 parts of cyanuric chloride and 64.8 parts of 2,5-dichloroaniline provided a 93.5 per cent yield of 2,4-dichloro-6-(2,5-dichloroanilino)-s-triazine. Recrystallization from trichloroethylene provided a white crystalline material melting at 167.0 to 169.5° C. and containing 45.8 per cent chlorine corresponding to the theoretical chlorine content.

EXAMPLE XVI

*2,4 - dichloro - 6-(o-toluidino)-s-triazine.*—Reaction of cyanuric chloride with 43 parts of o-toluidine in accordance with the preceding example provided a quantitative yield of 2,4-dichloro-6-(o-toluidino)-s-triazine melting at 149-152° C. Recrystallization from benzene produced material melting at 156 to 157° C. containing 28.2 per cent chlorine while the empirical formula requires 27.8 per cent chlorine.

EXAMPLE XVII

*2,4-dichloro-6-(o-ethylanilino)-s-triazine.*—Reaction of cyanuric chloride with o-ethylaniline in accordance with the foregoing example provided a quantitative yield of 2,4-dichloro-6-(o-ethylanilino)-s-triazine melting at 119.5 to 120.5° C. This material contained 26.8 per cent chlorine while the empirical formula requires 26.3 per cent chlorine.

EXAMPLE XVIII

*2,4 - dichloro - 6 - (p - bromoanilino)-s-triazine.*—This product was prepared in 83 per cent yield from cyanuric chloride and p-bromoaniline. The product melted at 180 to 182.5° C. and contained 21.7 per cent chlorine and 25.1 per cent bromine. The theoretical halogen content of 2,4-dichloro-6-(p-bromoanilino)-s-triazine is 22.2 per cent chlorine and 25.0 per cent bromine.

EXAMPLE XIX

*Chlorination of 2,4-dichloro-6-anilino-s-triazine.*—2,4-dichloro-6-anilino-s-triazine was dissolved in carbon tetrachloride at atmospheric reflux temperature. Upon chlorinating by passing chlorine through the reaction mixture until a precipitate was formed produced 5 parts of a product melting at 165 to 175° C. for every 10 parts of starting material. The product contained 88 per cent 2,4-dichloro-6-(p-chlorophenyl)-s-triazine and 1.9 per cent 2,4 - dichloro-6-(o-chlorophenyl)-s-triazine. Evaporation of the filtrate from the above separation produced an additional 5 parts product per 10 parts of starting material melting at 119 to 134° C. which was found to contain 54 per cent and 35 per cent, respectively, of the foregoing 2,4-dichloro-6-(chlorophenyl)-s-triazines.

EXAMPLE XX

*2,4 - dichloro - 6-(2,4-dichloroanilino)-s-triazine.*—The above example was repeated in the presence of a catalyst such as iodine or anhydrous ferric chloride. The product from this preparation melted at 135 to 140° C. The product contained 45.8 per cent chlorine corresponding to 2,4-dichloro-6-(2,4-dichloroanilino)-s-triazine.

EXAMPLE XXI

*Bromination of 2,4-dichloro-6-(anilino)-s-triazine.*—A solution of 2,4-dichloro-6-(anilino)-s-triazine in carbon tetrachloride was treated with an equimolar amount of bromine at the reflux temperature at atmospheric pressure of the solution. In the presence of iodine catalyst the product consisted of 22 per cent 2,4-dichloro-6-(o-bromoanilino)-s-triazine and 69 per cent of 2,4-dichloro-6-(p-bromoanilino)-s-triazine. In a similar procedure employing benzene as the solvent the proportions of the two isomers were 27 and 57 per cent, respectively.

EXAMPLE XXII

*Bromination of 2,4 - dichloro-6-(anilino)-s-triazine.*— The foregoing example was repeated employing two equivalents of bromine to produce a product melting at 176 to 188° C. This product contained 39.9 per cent bromine and 13.9 per cent chlorine corresponding to a mixture of products predominating in 2,4-dichloro-6-(dibromoanilino)-s-triazines.

EXAMPLE XXIII

*2,4 - dichloro-6-(m-bromoanilino)-s-triazine.*—According to the procedure of Example XIV cyanuric chloride was repeated with m-bromoaniline to produce 2,4-dichloro-6-(m-bromoanilino)-s-triazine in a yield of 98 per cent. The white solid product melted at 130 to 140° C. and upon recrystallization from benzene the melting point was raised to 141.5 to 142° C. Analysis showed the product to contain 25.2 per cent bromine and 21.8 per cent chlorine corresponding closely to the theoretical of 25.0 and 22.2, respectively.

EXAMPLE XXIV

*2,4 - dichloro - 6 - (2,4-dichloroanilino)-s-triazine.*—In accordance with the above example 2,4-dichloro-6-(2,4-dichloroanilino)-s-triazine was prepared from cyanuric chloride and 2,4-dichloroaniline. The product produced in 99 per cent yield at a melting point of 149 to 150.5° C. and contained 46.3 per cent chlorine, the theoretical chlorine content being 45.8 per cent.

EXAMPLE XXV

*2,4 - dichloro-6-(3-chloro-2-methylanilino)-s-triazine.*— Reaction of cyanuric chloride with 3-chloro-2-methylaniline in acordance with the foregoing examples gave a 95 per cent yield of 1000 melting at 196.5 to 198.5° C. after recrystallization from benzene. The chlorine content was 37.1 per cent and the theoretical 36.7 per cent.

EXAMPLE XXVI

*2,4 - dichloro-6-(5-chloro-2-methylanilino)-s-triazine.*— Reaction of equimolar proportions of cyanuric chloro and 5-chloro-2-methyl aniline according to the foregoing examples provided 2,4 - dichloro - 6 - (5 - chloro-2-methylanilino)-s-triazine in 86 per cent yield. The recrystallized product melted at 191 to 192.5° C. and contained 37.4 per cent chlorine, the theoretical chlorine content being 36.73 per cent.

EXAMPLE XXVII

*2,4 - dichloro-6-(o-toluidino)-s-triazine.*—Dissolved in benzene and chlorine was passed through the mixture at atmospheric reflux temperature. Anhydrous ferric chloride was added to the solution as a catalyst. A product was obtained in 90 per cent yield and had a melting point of 147 to 161° C. The product contained 37.5 per cent chlorine while a mono chlorinated 2,4-dichloro-6-(o-toluidine)-s-triazine which contained 36.7 per cent chlorine.

EXAMPLE XXVIII

*2,4-dichloro-6-(m-chloroanilino)-s-triazine.*—By reacting cyanuric chloride with m-chloroaniline white crystals of 2,4-dichloro-6-(chloroanilino)-s-triazine were obtained in 96.9 per cent yield. This material had a melting point of 129–131° C. after recrystallization from triclene and a chlorine content of 38.6 per cent. The theoretical chlorine content is 38.6 per cent.

EXAMPLE XXIX

*2,4-dichloro-6-(p-biphenylamino)-s-triazine.*—By reacting cyanuric chloride with p-phenylaniline white crystals of 2,4-dichloro-6-(biphenylamino)-s-triazine were obtained in 97.5 per cent yield. This material had a melting point of 129–131° C. after recrystallization from benzene and a chlorine content of 22.2, the theoretical chlorine content being 22.4 per cent.

EXAMPLE XXX

*2,4-dichloro-6-(o-biphenylamino)-s-triazine.*—By reacting cyanuric chloride with o-phenylaniline white crystals of 2,4-dichloro-6-(o-biphenylamino)-s-triazine were obtained in 99.2 per cent yield. This material had a melting point of 139–141° C. after recrystallization from a mixture of benzene and isohexanes and a chlorine content of 22.3, the theoretical chlorine content being 22.4.

EXAMPLE XXXI

*2,4-dichloro-6-anilino-s-triazine.*—By reacting cyanuric chloride with aniline white crystals of 2,4-dichloro-6-anilino-s-triazine were obtained in 97.4 per cent yield. This material had a melting point of 134–136° C. after recrystallization from a mixture of benzene and isohexanes.

EXAMPLE XXXII

*2,4-dichloro-6-(p-cyanoanilino)-s-triazine.*—By reacting cyanuric chloride with p-cyanoaniline white crystals of 2,4-dichloro-6-(p-cyanoanilino)-s-triazine were obtained in 98.4 per cent yield. This material had a chlorine content of 26.7, the theoretical chlorine content being 26.6 per cent.

EXAMPLE XXXIII

*2,4 - dichloro - 6 - N - (p - azobenzeneamino) - s-triazine.*—By reacting cyanuric chloride with p-azobenzene white crystals of 2,4-dichloro-6-N-(p-azobenzeneamino)-s-triazine were obtained in 97.9 per cent yield. This material had a melting point of 211–213° C. after recrystallization from benzene and a chlorine content of 20.3. The theoretical chlorine content was 20.5 per cent.

EXAMPLE XXXIV

*2,4 - dichloro - 6 - (p - nitroanilino) - s - triazine.*—By reacting cyanuric chloride with p-nitroaniline white crystals of 2,4-dichloro-6-(p-nitroanilino)-s-triazine were obtained in 98.4 per cent yield. This material had a chlorine content of 23.7, the theoretical chlorine content being 24.8 per cent.

EXAMPLE XXXV

*2,4 - dichloro - 6 - (o - chloroanilino) - s - triazine.*— By reacting cyanuric chloride with o-chloroaniline white crystals of 2,4-dichloro-6-(o-chloroanilino)-s-triazine were obtained in 98.7 per cent yield. This material had a melting point of 155–157° C. after recrystallization from a mixture of benzene and isohexanes and a chlorine content of 38.1, the theoretical chlorine content being 38.6 per cent.

Certain methods for preparing the fungicidal triazines of this invention provide mixtures rather than the discrete chemicals as exemplified above. For some applications and in certain formulations such mixtures are preferred and offer economies in manufacture. Such processes comprise reacting one or two moles of a mixture of arylamines with the cyanuric chloride, said arylamine conforming to the requirement as to substituents as defined herein. A specific example comprises the nitration of chlorobenzene to provide a mixture of o-chloroaniline and p-chloroaniline. Upon condensation of this mixture of chloroanilines with cyanuric chloride a mixture of either 2,4-dichloro-6-(o and p-chloroanilino)-s-triazines or 2-chloro-4,6-di-(o and p-chloroanilino)-s-triazines is produced, depending upon whether one or two moles of the chloroaniline is condensed. Likewise by condensing between one and two moles of the chloroanilines with cyanuric chloride a variety of mixtures of all four products results. These mixtures are particularly effective in the present invention. Similarly other mixtures can be prepared by this method. In general this process comprises the nitration of an appropriate aryl compound to form a mixture of nitroaryl compounds followed by reduction of the nitro group to an amino group and condensation with one or two moles of cyanuric chloride.

In addition to the aryl-substituted amine group, the fungicidal 1,3,5-triazines of this invention contain at least one chlorine atom on a carbon atom of the triazine nucleus. The choice of whether one or two chlorine atoms and one or two arylamino groups be provided depends largely upon the type of application and the particular fungus organism which it is desired to destroy or inhibit from sporulating. In general, however, the 2,4-dichloro-6-(arylamino)-s-triazine grouping comprises a preferred species of our invention. Furthermore, by substitution of the arylamino group in a position ortho to the exocyclic nitrogen atom with selected radicals or atoms enhanced activity is usually exhibited. Of these latter, we prefer to substitute the aryl group with halogen atoms and hydrogen radicals, particularly lower alkyl groups containing from one to about eight carbon atoms. Thus, preferred classes of our fungitoxic agents comprise 2,4-dichloro-6-(alkylarylamino)-s-triazines, 2,4-dichloro-6-(haloarylamino)-s-triazines and 2,4-dichloro-6-(haloalkylarylamino)-s-triazines.

We have determined that the various embodiments of our triazine fungicides are effective against a wide variety of fungus organisms. Although there is a measurable difference in the rate at which our fungicides attack various fungus organisms, this can be readily determined by test. This difference is a matter of degree and providing that sufficient amount of fungicide is applied, protection is obtained against a wide variety of fungus organisms.

In order to obtain practical benefit from the inherent fungicidal activity of the above defined 1,3,5-triazines, we employ our compounds as formulations with relatively inert, surface-contacting agents. In the pure state the above compounds may be too effective or too potent in some applications to have practical utility as fungitoxicants. For example, in order to protect most effectively a surface such as a painted or wood surface, or the surface of a fruit, stem or leaf, or a concrete or other surface, it is preferred to apply our materials in intimate contact but thoroughly dispersed on the surface thereof. Likewise, in treating more or less porous material such as cloth, felted textiles and woven fibers, it is important that our materials be interspersed between the fine structure of such materials and be in intimate contact therewith. Therefore, in order to benefit from our discovery that the defined materials are effective fungicides, we incorporate therewith a relatively inert surface-contacting agent or adjuvant as a dispersing medium. Furthermore, such adjuvants have the effect of requiring only minute quantities of the above-defined compounds in some formulations to obtain effective protection. A further advantage of so extending these materials is to permit field application by methods readily employed and still obtain effectively complete coverage of the material being protected.

The formulations of this invention, therefore, comprise the hereinabove defined fungitoxic triazines and a suitable material as an adjuvant therefor. It is not intended that this invention be limited to any specific proportions of active ingredient and adjuvant. The important feature of the invention is to provide such an adjuvant that upon the preparation of a formulation of such concentration as appropriate for application the adjuvant will be present to provide the proper type of contact with the material being protected. Thus in one embodiment the adjuvant can comprise a surface active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage and the like. Such a formulation lends itself directly to further dilution with the carrier without resorting to complicated mixing, blending and grinding procedures. Thus such a formulation can be further diluted with a solid carrier of the dust type by a simple mixing operation. Likewise such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

It is also intended that the term "adjuvant" include solid carriers of the type of talc, pyrophyllite, Atticlay, kieselguhr, chalk, diatomaceous earth and the like; and various mineral powders such as calcium carbonate and the like, which act as a dispersant, as a carrier, and in some instances perform the function of a surface active agent.

One utility of the chloroarylamino-s-triazines of this invention is their ability to prevent fungus, mildew or mold attack in various industrial applications. Typical of such applications include incorporating these fungicidal triazines in paints wherein certain ingredients of the paint provide the adjuvant action referred to above. Other surface coatings containing these triazines are resistant to mildew which may occur on the outside of a surface treated with such surface coatings. Similarly these triazines are effective in protecting so-called emulsion type paints which comprise a water emulsion of an oil, pigment and coating vehicle. Upon standing exposed to atmospheric conditions such paints in the container are subject to fungicidal attack resulting in a breaking of emulsion and rendering the paint generally unfit for use. Other examples of applications of the triazines of this invention include fabric mildew proofing, prevention of sap stain and mold on lumber, protection of plastics, in particular vinyl type plastics, preservatives for paper to prevent slime mold, in particular for cardboard containers subjected to high temperature and high humidity, and as a preservative for leather to prevent attack thereon by mildewing. In the above and other instances wherein these triazines are effective preservatives, the feature of providing therewith an adjuvant is important to producing the greatest level of protection. Such adjuvants may be introduced as a preformed formulation with the fungitoxicant or can be present as an ingredient of the material being protected.

One method of applying these fungicides is in the form of a water suspension. However, to obtain a fungicidally active aqueous suspension, I employ a surface active agent in sufficient amount to disperse and suspend the fungicidal agent. Examples of such surface-active agents which can be employed in forming dispersions include salts of the alkyl and alkylaryl sulfonates, such as Du Pont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples' Non-Ionic-218. Still other surface-active agents can be employed, the above merely showing a representative list of the more common materials.

In the examples which follow all parts are parts by weight.

EXAMPLE XXXVI

A formulation of 2,4-dichloro-6-(2-chloroanilino)-s-triazine was prepared by finely grinding 10 parts of this material and adding the resulting powder to 1000 parts of water containing one part of Tween-80 with vigorous agitation. This concentrated dispersion was further diluted 1000 times by the addition of water to obtain a formulation of suitable concentration for application. Thus the resulting dispersion contained 10 p. p. m. of our fungicide in the water dispersion.

In a similar manner aqueous dispersions were prepared at concentrations of 0.1, 1.0, 10 and 100 p. p. m. of the following fungicides of my invention: 2-chloro-4,6-bis(p-nitroanilino)-s-triazine, 2,4-dichloro - 6 - (p-chloroanilino)-s-triazine, 2,4-dichloro-6-(p-anisidino)-s-triazine, 2,4-dichloro-6-(α-napthylamino)-s-triazine, 2 - chloro-4,6-bis(2,5-dichloroanilino)-s-triazine and 2-chloro-4,6-bis(p-anisidino)-s-triazine. Similar aqueous dispersions of the following fungicides of my invention are also made with equally good results: 2-chloro-4,6-bis(9-phenanthrylamino) - s - triazine, 2,4-dichloro-6-(3-dodecylanilino)-s-triazine, 2-chloro-4,6-bis(p-vinylanilino)-s-triazine, 2,4-dichloro-6-(p-allylanilino)-s-triazine, 2-chloro-4-anilino-6-(4-chloroanilino)-s-triazine, 2-chloro-4-(o-anisidino)-6-(3-mercapoanilino)-s-triazine and 2-chloro-4-(4-methylmercapoanilino)-s-triazine.

The solubility of the s-triazines in organic solvents, furthermore, is such that they can be applied advantageously in the form of solutions in this type of solvent, and for certain uses this method of application is preferred. For example, in treating cloth, leather or other fibrous articles it is preferred to apply the fungicides dissolved in a volatile solvent. After use the volatile solvent evaporates, leaving the fungicidal agent impregnated throughout the surface of the article and in the dispersed form which has been found to be most advantageous. Likewise, in applying the fungicides to smooth surfaces, as for example in treating wood surfaces for protection against fungus attack, such as mildew and sap stain, or to inhibit fungus growths on damp concrete surfaces, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for the fungicides I use hydrocarbons, such as benzene, zylene or toluene; ketones, such as acetone, methylethyl ketone and cyclohexanone; chlorinated solvents, such as carbon tetrachloride, trichloro- and perchloro-ethylene; esters, such as ethyl, butyl and amyl acetates; and alcohols, such as ethanol, isopropanol, and amyl alcohols. Other solvents which are employed are the Carbitols and Cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to the formulations.

EXAMPLE XXXVII

A solution consisting of 5 parts of 2,4-dichloro-6-(4-chloroanilino)-s-triazine in 250 parts of cyclohexanone was prepared by stirring the two constituents for a period of fifteen minutes at a temperature of about 25° C. This concentrated solution, suitable for storage or transportation, was further diluted with 99,750 parts of kerosene to form a final dilution of 50 p. p. m. suitable for application.

Similarly concentrated solutions of 2-chloro-4,6-dianilino-s-triazine, 2,4-dichloro-6-anilino-s-triazine, 2-chloro-4,6-bis(α-naphthylamino)-s-triazine, 2-chloro-4,6-bis(p-vinylanilino)-s-triazine, 2-chloro - 4,6 - bis(2,5 - dichloroanilino) - s - triazine, 2-chloro-4-(o-anisidino)-6-(3-mercaptylanilino) - s - triazine, 2,4 - dichloro - 6 - (N-methylanilino)-s-triazine and 2-chloro-4-(N-methylanilino)-6-(β-napthylamino)-s-triazine are prepared in each of the following solvents: ethyl acetate, kerosene, perchloroethylene, and cellosolve, and final dilutions for application are prepared by the addition of further quantities of kerosene with equally good results.

The preferred formulation of the arylamine triazine fungicides of this invention comprises a wettable powder. In preparing wettable powders several formulation procedures are possible. Thus it is one intention of this invention to provide compositions comprising the chloroarylamine triazines defined herein in combination with a minor amount of a surface-active agent. Such surface-active agent can be chosen, for example, from among the following: alkyl and alkylaryl sulfonates, such as Du Pont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples' Non Ionic-218. Still other surface-active agents can be employed, the above merely showing a representative list of the more common materials. Employing such formulated materials can thus comprise the simple admixture with a dust carrier. Such formulation then comprises a chloroarylamine triazine, a surface-active agent and the inert carrier. Among the inert carriers which can be successfully employed in thus preparing wettable powders include, for example, soybean flour, tobacco flour, walnut shell flour, wood flour, sulfur, Tripolite, Diatomite, calcium lime, magnesium lime, Calcite, Dalomite, Gypsum, mica, talc, Pyrophyllite, Montmorillonite, Kaolinite, Attapulgite, Apatite and pumice. In preparing such concentrated wettable powders it is preferred to employ between about 0.1 and 5 per cent of the surface-active agent based upon the amount of active ingredient, and from 25 to 85 per cent of the inert carrier based upon the total amount of the formulation. Such formulations provide the advantage of permitting storage and transportation of the fungitoxicant and permit further dilution by simple admixture with water at the time of application. Thus within the scope of this invention is also contemplated finished formulations for direct application comprising the fungi-toxicant as defined herein; surface-active agents, as illustrated above; inert solid carriers, as likewise illustrated above, all suspended in water. Such finished formulations, depending upon the application in mind, can include between about 0.1 to 10,000 p. p. m. of active ingredient. A preferred range for agricultural application is between 0.1 and 2,000 p. p. m. Typical formulations of such wettable powders of this invention are illustrated in the following wherein the material 2,4-dichloro-6-(o-chloroanilino)-s-triazine is employed as the fungitoxicant. Similar formulations can readily be prepared from the other fungitoxicants of this invention.

EXAMPLE XXXVII(A)

A mixture of 100 parts of 2,4-dichloro-6-(p-anisidino)-s-triazine, 1000 parts of Attaclay and 0.1 part of Nacconol was milled through a hammer mill and the resulting powder sieved to pass a 100-mesh screen. This 10 per cent wettable powder produced a satisfactory water suspension when 11 parts were stirred into 10,000 parts of water to produce a suspension containing 100 p. p. m. active ingredient.

Similar wettable powders are prepared by milling 2-chloro - 4,6 - bis(N - methyl - 2,5 - dichloroanilino) - s-triazine, 2,4-dichloro-6-(α-(4-chloronaphthylamino))-s-triazine, 2-chloro-4-anilino-6-(4-chloroanilino)-s-triazine, 2-chloro-4,6-bis(p-cyanoanilino)-s-triazine, 2,4-dichloro-6-(5-propenyl-β-naphthylamino)-s-triazine, 2,4-dichloro-6-(α-naphthylamino)-s-triazine and 2-chloro-4-(2,4-dimethylanilino)-6-anilino-s-triazine, with a carrier and a surface-active agent.

In addition to the above-described methods of wet application of the 1,3,5-triazines, compositions can be prepared in which the materials are extended in talc, clay or other solid diluents. Such carriers perform the adjuvant function as contact agents. Such formulations have particular utility in the treatment of seeds, wherein an aqueous application may promote premature germination, or where a solvent application may damage the seed. For certain field crop applications a dust formulation is also preferred wherein a wet application might introduce certain secondary effects which are undesirable. Further specific examples of such typical inert solid carriers which can be employed as diluents in the dust formulations include fuller's earth, Pyrophillite, Attaclay and the Filtrols.

EXAMPLE XXXVIII

A dust formulation of one of the fungicides was prepared as follows: One part of 2-chloro-4,6-bis(4-nitroanilino)-s-triazine was placed in a hammer mill with 100 parts of fuller's earth. This mixture was milled for a period of one hour and screened to collect a fraction passing a 100-mesh sieve. This one per cent by weight formulation can be applied directly or further diluted. A further dilution was made by repeating the above procedure with an additional 9,900 parts of fuller's earth.

Similar dust formulations are prepared from the following compounds: 2,4-dichloro-6-anilino-s-triazine, 2,4-dichloro-6-(α-naphthylamino)-s-triazine, 2,4-dichloro-6-(3-dodecylanilino)-s-triazine, 2-chloro-4,6-bis(p-vinylanilino)-s-triazine, 2,4-dichloro-6-(4-chloroanilino)-s-triazine, 2 - chloro - 4 - (4 - methylmercaptoanilino) - 6 - (p-anisidino)-s-triazine, 2-chloro-4,6-bis(N-methyl-2,5-dichloroanilino)-s-triazine and 2-chloro-4,6-bis(diphenylamino)-s-triazine, by treating them in a hammer mill as above with Filtrol with equally good results.

For certain applications it is preferred to employ the fungicides in the form of oil-in-water emulsions. Thus, a concentrate of the fungicidal agent is prepared in a water-insoluble solvent and this solution is then dispersed or emulsified in water containing a surface-active agent. Typical examples of such solvents include hydrocarbons, such as kerosene, benzene or naphtha, higher alcohols, such as butanol, oleyl alcohol or ethers and esters thereof, and chlorinated solvents, such as perchloroethylene, and trichloroethylene.

EXAMPLE XXXIX

An oil-in-water emulsion was prepared by dissolving 10 parts of 2,4-dichloro-6-(α-naphthylamino)-s-triazine in 1000 parts of kerosene. This solution was dispersed with vigorous agitation in 99,000 parts of water containing 1 part of Triton X–100, to provide a dispersion containing 10 p. p. m. of active agent. When similar solutions of 2,4-dichloro-6-anilino-s-triazine, 2-chloro-4-anilino-6-(4-hydrindenylamino)-s-triazine, 2,4-dichloro-6-(o-propenylanilino)-s-triazine, 2-chloro-4,6-bis(2-vinyl-α-naphthylamino)-s-triazine, 2-chloro-4,6-bis(p-cyanoanilino)-s-triazine and 2,4-dichloro-6-(p-benzoyloxyanilino)-s-triazine are prepared in kerosene, naphtha and trichloroethylene followed by dispersion in water equally satisfactory emulsions are obtained.

In addition, I have found that I can incorporate an adherent or sticking agent such as vegetable oils, naturally occurring gums, and other adhesives in my 1,3,5-triazine formulations. Likewise, I can employ humectants in my formulations. Furthermore, these formulations can be employed in admixture with other fungicidal materials or other biocides such as insecticides, larvicides, bactericides, vermicides, miticides, or with other materials which it is desired to apply along with my fungicide, such as for example herbicides or fertilizers.

I have illustrated the utility of my fungicides as fungitoxic materials by determining the concentration at which the germination of 50 per cent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability of my fungicides to protect these and other important agricultural crops.

The standard procedure for determining the above-referred to effectiveness comprises dissolving the material to be applied in ten times the amount of acetone containing one-tenth the amount of a surface-active agent, Triton X–155. This solution is thereupon diluted to the indicated concentration with distilled water. This suspension, at various dilutions with distilled water was applied to a drop of water containing the test organism on a microscope slide. The concentration was thereby determined at which one-half of the fungi were prevented from sporulating. This standard slide-germination method is described and accepted by the Committee on Standardization of Fungicidal Tests of the American Phytopathological Society in "Phytopathology," 33, 627 (1943). In the table which follows is listed the concentration in p. p. m. to inhibit sporulation by 50 per cent ($ED_{50}$) on the two organisms listed.

*Table 1*

ACTIVITY OF TRIAZINES IN PREVENTING SPORULATION OF FUNGI

| | Slide Germination | |
|---|---|---|
| | *A. oleracea* | *S. fructicola* |
| (1) 2,4-Dichloro-6-(m-bromoanilino)-s-triazine | 0.005 | 0.5 |
| (2) 2,4-Dichloro-6-(2,4-dichloroanilino)-s-triazine | 0.005 | 0.5 |
| (3) 2,4-Dichloro-6-(3-chloro-2-methylanilino)-s-triazine | 0.5 | 5.0 |
| (4) 2,4-Dichloro-6-(o-methylanilino)-s-triazine | 0.05 | 0.5 |
| (5) 2,4-Dichloro-6-(p-bromoanilino)-s-triazine | 0.005 | 0.5 |
| (6) 2,4-Dichloro-6-(o-ethylanilino)-s-triazine | 0.05 | 0.5 |
| (7) 2,4-Dichloro-6-(5-chloro-2-methyl-anilino)-s-triazine | 0.05 | 0.5 |
| (8) 2,4-Dichloro-6-(phenylanilino)-s-triazine | 0.05 | 5.0 |
| (9) 2,4-Dichloro-6-(p-methoxyphenyl-anilino)-s-triazine | 0.05 | 5.0 |
| (10) 2,4-Dichloro-6-(o-bromophenyl-anilino)-s-triazine | 0.05 | 0.5 |
| (11) 2,4-Dichloro-6-(o-chlorophenyl-anilino)-s-triazine | 0.05 | 0.5 |
| (12) 2,4-Dichloro-6-(m-chlorophenyl-anilino)-s-triazine | 0.05 | 0.5 |
| (13) 2,4-Dichloro-6-(p-chlorophenyl-anilino)-s-triazine | 0.05 | 0.5 |
| (14) 2,4-Dichloro-6-(2,5-dichlorophenyl-anilino)-s-triazine | 0.05 | 0.5 |
| (15) 2,4-Dichloro-6-(p-cyanophenylanilino)-s-triazine | 0.5 | |
| (16) 2,4-Dichloro-6-(p-nitrophenyl-anilino)-s-triazine | 0.05 | |
| (17) 2,4-Dichloro-6-(α-naphthyl-anilino)-s-triazine | 0.05 | 0.5 |
| (18) 2,4-Dichloro-6-(β-naphthyl-anilino)-s-triazine | 0.05 | 5.0 |
| (19) 2,4-Dichloro-6-(o-diphenyl-anilino)-s-triazine | 0.5 | |
| (20) Copper sulfate—Basic | 50.0 | 50.0 |

Of particular importance in the treatment of agricultural crops against fungus diseases is the susceptibility of the plant to damage by the fungitoxicant employed. My materials are particularly advantageous in this respect since in a variety of tests I have found no evidence that my materials are toxic to plants or inhibit the normal functioning of the plant or the germination of seeds when applied in the compositions described in the foregoing. I have demonstrated the innocuous nature of my fungitoxicant formulations by dipping the entire leaf of each of corn, soybean, tomato, cucumber and cotton plants in suspensions of my fungicides at concentrations as high as 10,000 p. p. m. and have observed no adverse effect on the so-treated plants or upon the leaves which were dipped. Furthermore, each of these plants was totally sprayed with dispersions of my fungicides in water at a concentration of 10,000 p. p. m. without any deleterious effect on the plant. Even when my fungicides are applied as a lanolin paste to the stem of young plants of the above species no adverse effects were noted.

I have established the innocuous nature in agricultural applications of wettable powder formulations of the triazines of this invention by applying such formulations suspended in water to tomato plants at various concentration levels. In the table which follows the scale corresponds to 0—no effect, up to 11—wherein the plant is dead. It will be seen that by proper formulation the materials can be safely applied to agricultural crops. In Table II the typical results shown are employing 2,4-dichloro-6-(o-chlorophenylaniline)-s-triazine.

spray gun. Each turntable load of plants was sprayed with 85 cc. of spray suspension. No appreciable loss of fungicide from the plants because of run-off occurs under these conditions. Under the conditions used, the standard solution provided a deposit of approximately 0.0015 gm. of fungicide per 100 cm. of total leaf area (i. e., including upper and lower leaf surfaces) is obtained. After the fungicide deposit was allowed to dry, the plants were inoculated with a spore suspension of the test fungus, *Alternaria solani*. The spores were obtained from fungus cultures grown on salt-potato-dextrose-agar at 20° C. for 7–14 days. Twenty cc. of a suspension containing 50,000 spores per cc. was used to inoculate each turntable load of plants. The spores were sprayed under an air pressure of 10 p. s. i. by means of a De Vilbiss atomizer held about one foot from the plants. Both the upper and lower leaf surfaces were uniformly inoculated by this method. Following inoculation, the plants were placed in an infection chamber which was maintained at 20° C. and 100 per cent relative humidity. After 40–48 hours in this chamber, the plants were removed to a greenhouse bench. Lesions usually developed 3 to 4 days after inoculation. The total number of early blight lesions on three compound leaves of each sprayed plant were determined. Leaves having the same position on the plant were counted for all treatments and the controls. The data in Table III report the concentrations p. p. m. at which 95 per cent control of the disease is obtained. For this purpose a number of young tomato plants were infected with *Alternaria solani*. This test is

Table II
PHYTOTOXICITY DATA ON 2,4-DICHLORO-6-(O-CHLORO-ANILINO)-S-TRIAZINE

| Surface Active Agent, Percent | | Inert Carrier | Dispersant, Percent | | Phytotoxicity Tomato Spray, p. p. m. | | | | |
|---|---|---|---|---|---|---|---|---|---|
| | | | | | 12,800 | 6,400 | 3,200 | 1,600 | 800 |
| Aerosol OS | 2.0 | Celite 209 | None | | | 5 | 2 | 1 | 0 |
| Do | 0.75 | Quincy No. 4 | Marasperse-N | 0.75 | 0 | 0 | 0 | 0 | |
| Do | 0.75 | Inert "C" | do | 0.75 | | 3 | 1 | 0 | 0 |
| Do | 0.75 | Celite 209 | do | 0.75 | | 6 | 1 | 1 | 0 |
| Do | 0.75 | Dicalite IG-1 | do | 0.75 | | | 2 | 1 | 1 |
| Do | 2.0 | Celite 209 | do | 2.0 | | 4 | 3 | 1 | 1 |
| Do | 3.0 | Pyrax ABB | None | | 3 | 0 | 0 | 0 | |
| Do | 3.0 | Nytal 300 | do | | 5 | 2 | 1 | 0 | |
| Do | 3.0 | Barden AG Clay | do | | | 3 | 2 | 1 | |
| Do | 3.0 | Quincy No. 4 | do | | 2 | 1 | 0 | 0 | |
| Do | 3.0 | Attaclay | do | | | 4 | 3 | 2 | |
| Do | 3.0 | Inert "C" | do | | | 3 | 1 | 0 | |
| Ethomid HF/25 | 2.0 | Celite 209 | do | | | | | 3 | 1 |
| Renex | 3.0 | Perry Clay | do | | | 1 | 1 | 1 | 0 |
| Do | 3.0 | Quincy No. 4 | do | | | 2 | 1 | 0 | |
| Santomerse D | 1.5 | Celite 209 | Marasperse-N | 1.5 | 4 | 2 | 1 | 0 | |
| Do | 1.0 | Hi-Sil | do | 1.5 | | 5 | 2 | 2 | 1 |

FOOTNOTES TO TABLE II

Aerosol OS is diisopropylnaphthylene sulfonate.
Antarox B-201 is a detergent manufactured by Antara Chemicals, Inc.
Atlas G-2081 is a detergent manufactured by Atlas Powder Co.
Ethomid HF/25 is a detergent manufactured by Armour Chemical Co.
Renex is a detergent manufactured by Atlas Powder Co.
Santomerse D is an alkylaryl sulfonate manufactured by Monsanto Chemical Co.
Celite 209 is a diatomite manufactured by Johns-Manville Co.
Quincy No. 4 is a calcium carbonate manufactured by the Calcium Carbonate Co.
Inert "C" is a kaolin clay manufactured by Hammill and Gillespie Co.
Dicalite IG-1 and IG-5 are diatomites manufactured by the Dicalite Division of Great Lakes Carbon Co.
Pyrax ABB is a pyrophillite manufactured by R. T. Vanderbilt Co.
Nytal 300 is a talc manufactured by R. T. Vanderbilt Co.
Barden AG Clay is a kaolin clay manufactured by J. N. Hubert Co.
Attaclay is an Attapulgite manufactured by Attapulgus Clay Co.
Perry Clay is a kaolin clay produced by the United Clay Mines.
Hi-Sil is a silicate manufactured by Colombia Southern Division of Pittsburgh Plate Glass Co.
Marasperse-N is a sodium lignin sulfonate manufactured by Marathon Chemical Co.
1600 p. p. m. is the maximum expected field dosage.

The effectiveness of my fungicides in protecting growing plants from fungus diseases has been demonstrated by control of the tomato early blight. This test involves spraying the test plants with various dilutions of a standard 0.2 per cent concentration of the fungicide, inoculation with spores of *Alternaria solani*, and determination of the number of disease lesions which develop. Bonny Best tomato plants grown in three-inch pots to a height of 4–7 inches were used as host plants. Three replicate plants were used for each compound. The 0.2 per cent spray suspension of the compounds were made up in 0.01 per cent Tween-20 solutions in all cases. The tomato plants were sprayed on a revolving turntable with the fungicide suspension by means of a De Vilbiss paint further described by Wellman and McCallan, Contrib. Boyce Thompson Inst., 13, 171 (1943).

Table III

| Fungicide | Tomato Foliage Disease, ED$_{50}$ p. p. m. | |
|---|---|---|
| | Early Blight | Late Blight |
| 2,4-Dichloro-6-(m-bromo anilino)-1,3,5-triazine | 275 | 150 |
| 2,4-Dichloro-6-(2,4-dichloro-anilino)-1,3,5-triazine | 170 | 250 |
| 2,4-Dichloro-6-(3-chloro-2-methyl anilino)-1,3,5-triazine | 300 | |
| 2,4-Dichloro-6-(o-methyl anilino)-1,3,5-triazine | 110 | 130 |

In general the fungicidal compositions are effective over a wide range of concentrations of the fungicidal 1,3,5-s-triazine. Thus, at concentrations as high as 10,000 p. p. m. I obtain effective fungicides which are safe for agricultural applications, and at concentrations as low as 0.1 p. p. m. I obtain protection. Furthermore, I can employ still higher concentrations for certain applications to inanimate objects and can formulate higher concentrations which are stable, for storage or handling. In general, however, I prefer the range of 0.1 to 2000 p. p. m. for effective fungicidal use in agricultural applications.

In addition to acting as a protective fungicide by killing or preventing sporulation, chloro-arylamino-s-triazines, as defined herein, when properly formulated have an eradicant property. By this it is meant that on application to growing crops the formulation will destroy or prevent further increase of fungus colonies already in active growth. This property is particularly apparent in treatment of apple scab.

Further utility of the formulations of this invention has been demonstrated by applying formulations thereof to carnations infected with alternaria. Preferred formulation for this use comprises a 50 per cent wettable powder dispersed at the rate of one pound per 100 gallons of water. Similar good protection was provided by this treatment to Chrysanthemum Septoria, Iris Leaf Spot (Heterosporium) and the like. In these treatments as good or better protection was provided by 2,4-dichloro-6-(chloroanilino)-s-triazine, for example, than carbamates or Bordeaux mixture.

It is characteristic of the fungicidal formulations of this invention and is a property rarely encountered in organic fungicides that they are effective both on fruits and vegetables. Thus is provided for agricultural purposes a fungicide which has wide applicability and can be employed for overall control, obviating the use of a special mixture for fruits and a special mixture for vegetables.

An unusual property exhibited in agricultural applications by formulations of this invention is a type of growth regulation which is evidenced by the production under certain conditions of more luxuriant and healthy crops. This property has been exhibited, for example, when a 50 per cent wettable powder formulation of 2,4-dichloro-6-(o-chloroanilino)-s-triazine diluted at the rate of 3 pounds per 100 gallons of water was applied to potato vines growing under extremely dry conditions. Companion plots growing under identical conditions were either destroyed by fungi, if untreated, or exhibited dead vines even when treated with other commercial fungicides, whereas the vines treated by the above formulation remained green and vigorous. Likewise, on tomatoes the above formulation has been observed to stimulate the growth of the plant.

In general certain limitations can be considered in the chemical structure of the fungicidal ingredient of the formulations of this invention. For instance, it is preferred that the aryl group of the triazine be free of salt-like substituents such as carboxylic and sulfonic acids, and salts and derivatives thereof. Likewise, it has been determined that superior results have been obtained when the aryl groups of the arylamino radical are hydrocarbonaceous. Thus the fungitoxicants of the formulations of this invention can be represented by the general formula

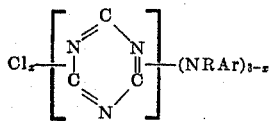

wherein $x$ is an integer from 1 to 2 inclusive, R is hydrogen or a lower alkyl group, that is, an alkyl group containing 1 to 8 carbon atoms inclusive, and Ar is an aromatic hydrocarbon radical such as phenyl, naphthyl or phenanthryl, which may be further ring substituted with hydrocarbon or monovalent radicals chosen from nitroso, nitro, amino, substituted amino, chloro, bromo, iodo, hydroxyl, substituted hydroxyl, azo, cyano, thiocyano, acyloxy, aroyloxy, mercaptyl and substituted mercaptyl groups.

This application is a continuation-in-part of applicant's copending application, Serial No. 244,723, now abandoned.

I claim:

1. A fungicidal composition of a fungitoxicant having the formula

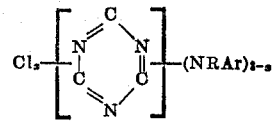

wherein $x$ is an integer from 1 to 2 inclusive, R is selected from the group consisting of hydrogen and a lower alkyl group and Ar is selected from the group consisting of phenyl, diphenyl, naphthyl, anthracyl and phenanthryl radicals and substituted derivatives thereof wherein said substituents are selected from the group consisting of aliphatic hydrocarbon, endo-aliphatic hydrocarbon, aryl hydrocarbon, nitroso, nitro, amino, chloro, bromo, iodo, hydroxyl, azo, cyano, thiocyano, acyloxy, aroyloxy, and mercaptyl groups as a principal active ingredient, and a dispersing agent.

2. The composition of claim 1 wherein the dispersing agent is a surface active agent.

3. The composition of claim 1 wherein $x$ is 1.

4. The composition of claim 1 wherein $x$ is 2.

5. The method of preventing sporulation of fungi which consists of subjecting said fungi to the action of the fungicidal composition of claim 1.

6. A fungicidal composition consisting essentially of 2,4-dichloro-6-(chloroanilino)-1,3,5-triazine, a dispersing agent, and an inert diluent.

7. A fungicidal composition of the fungitoxicant of claim 1 and a finely divided solid carrier as a dispersing agent therefor.

8. A wettable powder fungicidal composition of claim 1 wherein the fungitoxicant is dispersed in a finely divided solid adjuvant as a carrier therefor, and a surface active agent.

9. The fungicidal composition of claim 1 wherein the fungitoxicant is dissolved in a solvent therefor containing a surface active agent.

10. A colloidal dispersion of the fungitoxicant of claim 1 colloidally dispersed in a mixture of a hydrocarbon oil and water containing a surface active agent.

11. A fungicidal suspension of the fungitoxicant of claim 1 in water containing a surface active agent.

12. A fungicidal composition of 2,4-dichloro-6-(chloroarylamino)-s-triazine fungitoxicant and a surface active agent as the dispersing agent therefor.

13. A fungicidal composition of 2,4-dichloro-6-(o-chloroanilino)-s-triazine and a surface active agent as the dispersing agent therefor.

14. A fungicidal composition of 2,4-dichloro-6-(p-chloroanilino)-s-triazine and a surface active agent as the dispersing agent therefor.

15. A fungicidal composition of 2,4-dichloro-6-(bromoarylamino)-s-triazine fungitoxicant and a surface active agent as the dispersing agent therefor.

16. A fungicidal composition of 2,4-dichloro-6-(o-bromoanilino)-s-triazine and a surface active agent as the dispersing agent therefor.

17. A fungicidal composition of 2,4-dichloro-6-(aliphatic hydrocarbon substituted-arylamino) - s - triazine fungitoxicant and a surface active agent as the dispersing agent therefor.

18. A fungicidal composition of 2,4-dichloro-6-(o-toluidino)-s-triazine and a surface active agent as the dispersing agent therefor.

19. A fungicidal composition of 2,4-dichloro-6-(nitro-arylamino)-s-triazine fungitoxicant and a surface active agent as the dispersing agent therefor.

20. A fungicidal composition of 2,4-dichloro-6-(hydroxyarylamino)-s-triazine fungitoxicant and a surface active agent as the dispersing agent therefor.

References Cited in the file of this patent

UNITED STATES PATENTS

| 2,034,983 | Jensch | Mar. 24, 1936 |
| 2,537,816 | Dudley | Jan. 9, 1952 |

FOREIGN PATENTS

| 108,193 | Switzerland | of 1924 |